(12) United States Patent
Fujimoto et al.

(10) Patent No.: US 6,701,015 B2
(45) Date of Patent: Mar. 2, 2004

(54) CHARACTER STRING EXTRACTION APPARATUS AND METHOD BASED ON BASIC COMPONENT IN DOCUMENT IMAGE

(75) Inventors: Katsuhito Fujimoto, Kawasaki (JP); Hiroshi Kamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/960,978

(22) Filed: Sep. 25, 2001

(65) Prior Publication Data

US 2002/0012465 A1 Jan. 31, 2002

Related U.S. Application Data

(63) Continuation of application No. PCT/JP99/01986, filed on Apr. 14, 1999.

(51) Int. Cl.[7] ................................................. G06F 9/48
(52) U.S. Cl. ...................... 382/199; 382/176; 382/177; 382/187; 382/190; 715/520; 715/521; 715/540; 715/541
(58) Field of Search ................................. 382/175–179, 382/181–190, 198, 202, 173; 704/10; 707/515, 517, 539–544

(56) References Cited

U.S. PATENT DOCUMENTS

| 5,448,692 | A | * | 9/1995 | Ohta | 715/520 |
|---|---|---|---|---|---|
| 5,555,362 | A | * | 9/1996 | Yamashita et al. | 715/517 |
| 5,708,730 | A | * | 1/1998 | Itonori | 382/177 |
| 5,854,853 | A | * | 12/1998 | Wang | 382/176 |
| 6,035,061 | A | * | 3/2000 | Katsuyama | 382/177 |
| 6,098,071 | A | * | 8/2000 | Aoyama et al. | 707/102 |
| 6,173,253 | B1 | * | 1/2001 | Abe et al. | 704/10 |
| 6,269,188 | B1 | * | 7/2001 | Jamali | 382/229 |
| 6,272,242 | B1 | * | 8/2001 | Saitoh et al. | 382/187 |
| 6,310,971 | B1 | * | 10/2001 | Shiiyama | 382/181 |
| 6,332,046 | B1 | * | 12/2001 | Fujimoto et al. | 382/289 |
| 6,353,840 | B2 | * | 3/2002 | Saito et al. | 707/517 |
| 6,411,731 | B1 | * | 6/2002 | Saito | 382/173 |
| 6,438,566 | B1 | * | 8/2002 | Okuno et al. | 707/512 |
| 6,466,694 | B2 | * | 10/2002 | Kamada et al. | 382/181 |
| 6,606,408 | B1 | * | 8/2003 | Kang et al. | 382/164 |

FOREIGN PATENT DOCUMENTS

| JP | A-05-166002 | 7/1993 |
|---|---|---|
| JP | A-09-16713 | 1/1997 |

* cited by examiner

*Primary Examiner*—Bhavesh M. Mehta
*Assistant Examiner*—Gregory Desire
(74) *Attorney, Agent, or Firm*—Staas & Halsey LLP

(57) ABSTRACT

A character string extraction apparatus extracts an aggregate of basic components from a document image, such as a binary image, gray scale image, color image, etc., and judges whether each basic component is a character component using an inclusion relationship between the basic components. Then, the character string extraction apparatus extracts an aggregate of character components based on the judgment result and extracts a character string from the aggregate of character components.

18 Claims, 18 Drawing Sheets

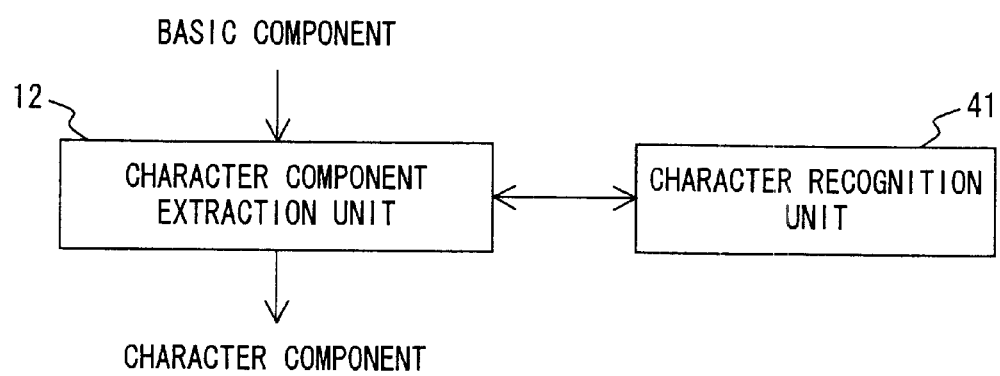
F I G. 7

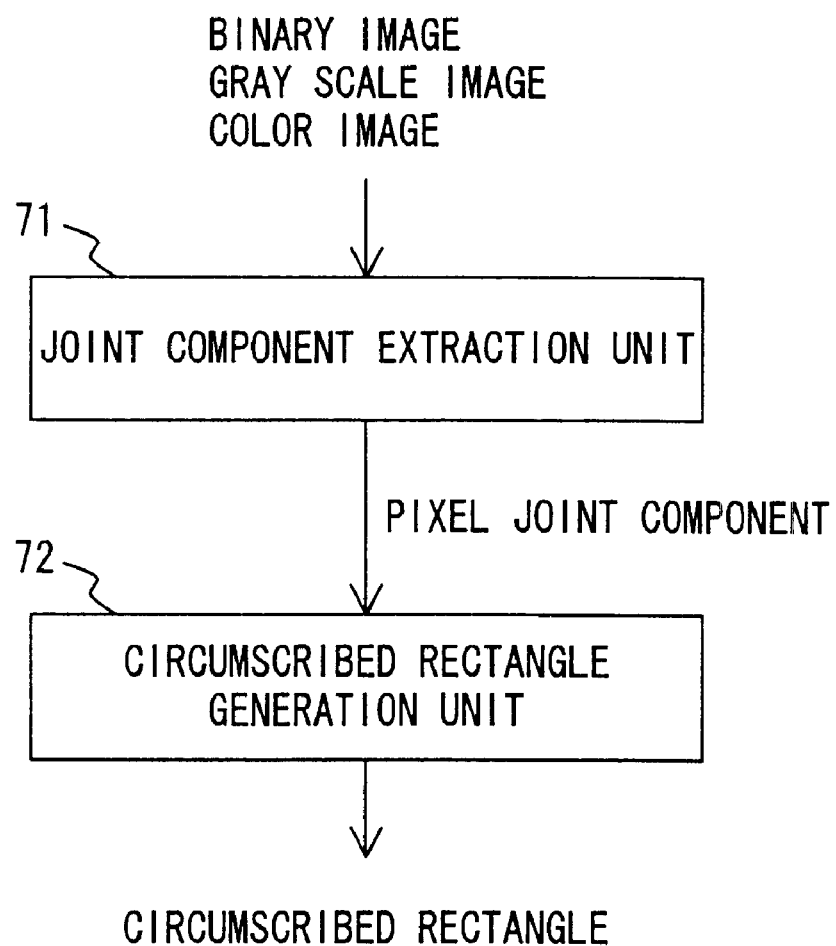
F I G. 1 2

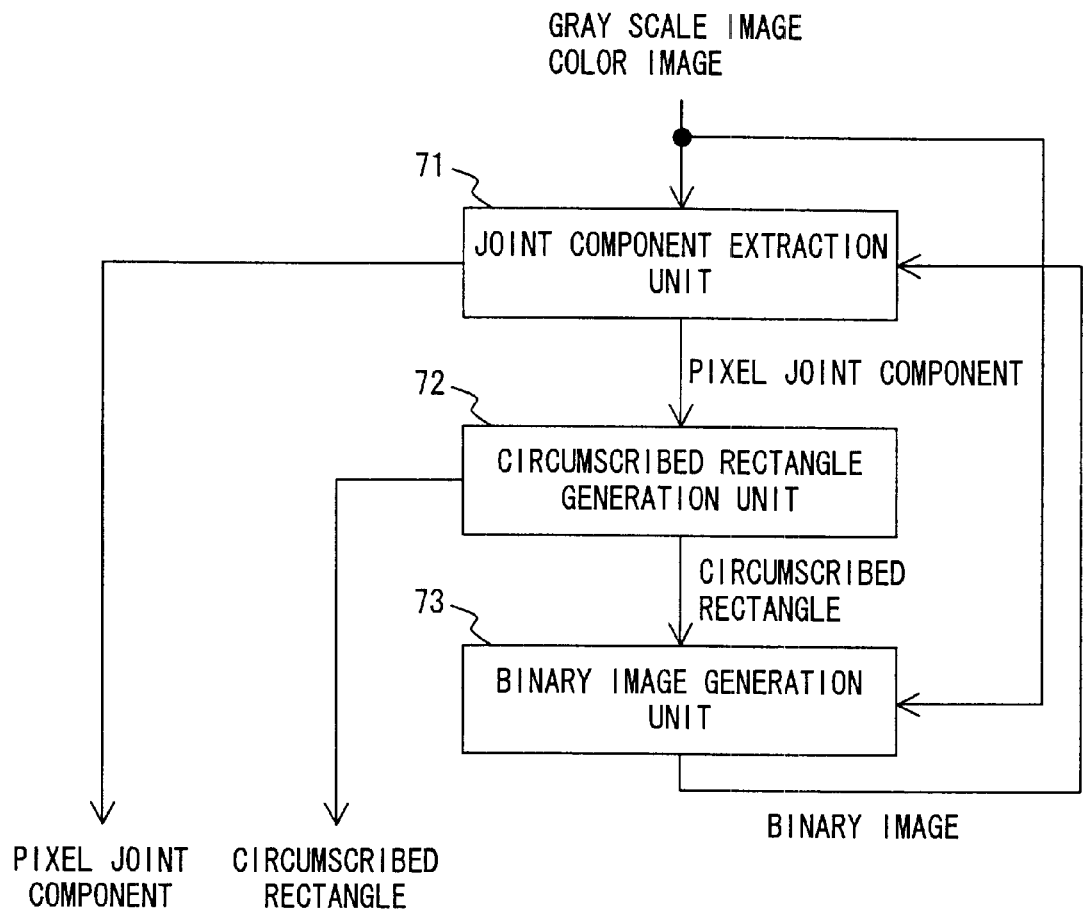
F I G. 1 3

CHARACTER STRING EXTRACTION APPARATUS AND METHOD BASED ON BASIC COMPONENT IN DOCUMENT IMAGE

CROSS REFERENCE TO RELATED APPLICATIONS

This application is a continuation application of International PCT Application No. PCT/JP99/01986 which was filed on Apr. 14, 1999.

BACKGROUND OF THE INVENTION

1. Field of the Invention

The present invention relates to a character string extraction apparatus for extracting a character string from a document image based on the basic components of information, such as characters, graphics, etc., included in a document image and a method thereof.

2. Description of the Related Art

A character string pattern in a document image corresponds to a sequence of one or more character patterns, and a character pattern corresponds to a pattern, such as a character, symbol, etc., of an arbitrary language. A character string extraction apparatus receives a document image as input, extracts a character string pattern from the document image and supplies the extracted character string pattern to a subsequent character encoding process or retrieval process. There is currently a character string extraction apparatus using a binary document image as input for such a product.

Recently, a document management system for sharing information has been focussed on and a mechanism for uniformly managing a variety of documents, such as an electronic document with structure, a raw image document without structure, a document recorded on paper, etc., is also demanded.

Therefore, a character string extraction apparatus for extracting text information from a document image for the purpose of information retrieval has also been highly expected as a technology to retrieve an image document without structure and a paper document. In particular, since gray scale documents and color documents containing a photograph have increased, necessity of the technology to accurately extract a character string from these documents has greatly increased.

To meet such a demand, several character string extraction technologies that can be used for various purposes and can handle a document in which a variety of pieces of information are mixed have been proposed. These technologies do not require any foreknowledge of document structure and a mixture of figures and text, a mixture of sentences horizontally and vertically written, and extraction of a character string in a figure are also taken into consideration in the technologies. Some typical methods of the technologies are described below.

However, a method using image gradation, a method using the projection distribution of black pixels and a method using the image feature in a local area have been excluded, since these methods are not suitable for the extraction of a complicatedly indented character string or the extraction of a character string in a figure.

A conventional character string extraction technology is based on the basic idea that an aggregate of character components, each of which is an image pattern representing a part of a character or the entire character, is extracted by some method and a character string as a partial aggregate of character components are extracted using the size homogeneity and spatial closeness between the character components. In this case, the accuracy of character component extraction greatly affects the accuracy of character extraction. In the conventional character component extraction method, the following methods are used.

In the first method of character component extraction, an aggregate of basic components, each of which is an image pattern representing a part of a character or the entire character, graphic, etc., is extracted by some method, the basic components are classified according to size/shape and only character components are extracted.

For example, in Patent Application Laid-open Nos. 61-072374 (Character Recognition Apparatus) and 61-026150 (Document Image File Registration Retrieval Apparatus) of Japanese Laid-open Patent Gazette, character components are extracted based on the assumption that the sizes of characters in a document image are almost the same.

In Patent Application Laid-open Nos. 62-165284 (Character String Extraction System) and 09-167233 (Image Processing Method and Image Processing Apparatus), the circumscribed rectangle of a black pixel joint component in a binary image is designated as a basic component, and a basic component of the size of a specific value or less is assumed to be a character component and is extracted.

In Patent Application Laid-open No. 06-111060 (Optical Character Reading Apparatus), a joint component for each color of a color image is designated as a basic component, a basic component of the size of a specific value or less is assumed to be a character component and is extracted, thereby realizing character string extraction from a color image.

In the second method of character component extraction, an aggregate of basic components are classified into character components and non-character components, using a confidence degree obtained by performing character or character string recognition for a character string candidate which is composed of a basic component or an aggregate of basic components.

For example, in Patent Application Laid-open No. 05-028305 (Image Recognition Apparatus and Recognition Method), character string candidates are generated by the spatial closeness between basic components, only candidates which seem to be a character string are selected based on the evaluation value obtained as a result of character recognition, and not only basic components but also character strings are extracted.

A method embodying both the first and second methods described above is also proposed. For example, in Patent Application Laid-open No. 07-168911 (Document Recognition Apparatus), the circumscribed rectangles of black pixel joint components are designated as basic components and the basic components are classified into four groups: a character candidate, a graphic candidate, a ruled line candidate and an image candidate, based on the size/ratio of the vertical and horizontal lengths. If a confidence degree that is obtained by performing character recognition for a character candidate is low, the character candidate is changed to a graphic candidate. If a confidence degree that is obtained by performing character recognition for a graphic candidate is high, the graphic candidate is changed to a character candidate and the character components are extracted.

However, an adequate accuracy of character component extraction cannot be obtained by such a conventional character string extraction technology, and as a result, an adequate accuracy of a character string itself also cannot be obtained, which is a problem.

According to the first method, if respective basic components corresponding to different kinds of information, such as a character and a graphic, have similar sizes, the extraction of character components fails, and as a result, the extraction of character strings also fails. Therefore, in this case, an adequate accuracy cannot be obtained.

According to the second method, even in such a case, distinction between a character component and a non-character component can be improved by performing character recognition or character string recognition. However, at the current level of the character recognition technology, the reliability of the confidence degree itself of a character recognition result is not sufficient.

Therefore, the threshold value of a confidence degree needed to judge with high reliability that a basic component is a character component must be set to a value greatly different from the threshold value of a confidence degree needed to judge with high reliability that a basic component is not a character component. As a result, it becomes difficult to judge a basic component having an intermediate confidence degree between the two threshold values, and if the basic component is incorrectly judged to be/not to be a character component, an adequate accuracy of character component extraction cannot be obtained.

SUMMARY OF THE INVENTION

It is an object of the present invention to provide a character string extraction apparatus for extracting a character string more accurately using basic components included in a document image and a method thereof.

The character string extraction apparatus according to the present invention comprises a basic component extraction unit, a character component extraction unit and a character string extraction unit.

The basic component extraction unit extracts an aggregate of a plurality of basic components from an input document image. The character component extraction unit judges whether a basic component corresponds to a character component using an inclusion relationship between basic components included in the aggregate of the basic components and extracts an aggregate of character components. The character string extraction unit extracts a character string using the aggregate of the character components.

BRIEF DESCRIPTION OF THE DRAWINGS

FIG. 7 shows character component extraction based on character recognition.

FIG. 12 shows the configuration of the second basic component extraction unit.

FIG. 13 shows the configuration of the third basic component extraction unit.

DESCRIPTION OF THE PREFERRED EMBODIMENTS

The preferred embodiments are described in detail below with reference to the drawings.

Figure 1:
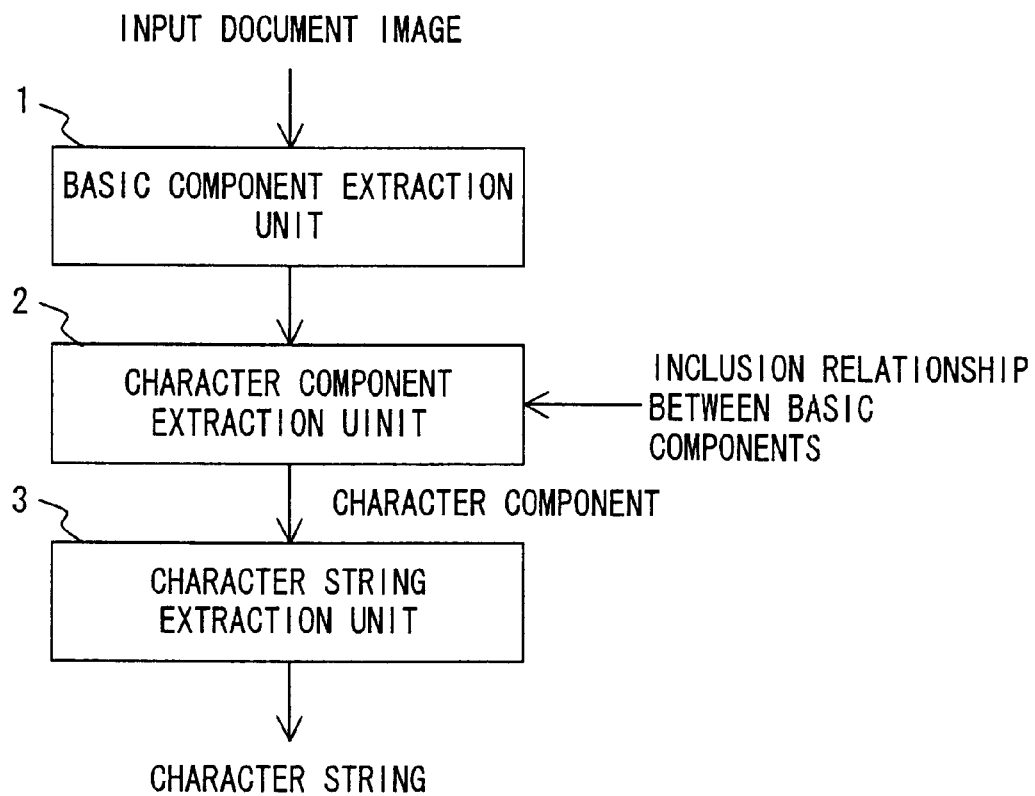
FIG. 1 shows the basic configuration of a character string extraction apparatus of the present invention.

FIG. 1 shows the basic configuration of a character string extraction apparatus of the present invention. The character string extraction apparatus shown in FIG. 1 comprises a basic component extraction unit 1, a character component extraction unit 2 and a character string extraction unit 3. The basic component extraction unit 1 extracts an aggregate of basic components from an input document image. The character component extraction unit 2 judges whether the basic components correspond to character components using an inclusion relationship between the basic components included in the aggregate of basic components and extracts an aggregate of character components. The character string extraction unit 3 extracts a character string using the aggregate of character components.

If a binary image, gray scale image or color image is inputted as a document image, the basic component extraction unit 1 extracts a pixel joint component, a circumscribed rectangle of a pixel joint component, etc., as a basic component. Then, the character component extraction unit 2 judges whether each basic component corresponds to a character component, using the inclusion relationship between the extracted basic components and extracts an aggregate of basic components that are judged to be character components, as an aggregate of character components. Then, the character string extraction unit 3 extracts character components corresponding to a character string from the aggregate of the extracted character components.

An inclusion relationship between basic components, which the character component extraction unit 2 uses, indicates a two-dimensional positional relationship, such as whether a specific basic component is included in another basic component or is excluded from it, whether a specific basic component overlaps another basic component, etc., in a document image.

The character component extraction unit 2 judges that, for example, a basic component including a prescribed number or more of basic components, a basic component overlapping a prescribed number or more of basic components and a basic component including at least one basic component judged to be a character component by some method, are not character components.

By also using the inclusion relationship between basic components in addition to both the size/shape of a basic component and the confidence degree of a character recognition result, basic components that could not be conventionally judged correctly can also be judged correctly. Therefore, not only the accuracy of character component extraction but also the accuracy of character string extraction can be improved.

In the preferred embodiments, it is judged whether a basic component is a character component, using an inclusion relationship between basic components in an aggregate of basic components obtained by some method, such as an aggregate of black pixel joint components in a binary image, an aggregate of joint components composed of the same color pixels in a color image, etc. Then, an aggregate of character components is extracted based on the judgment result and a character string is extracted from the aggregate of character components.

Figure 2:
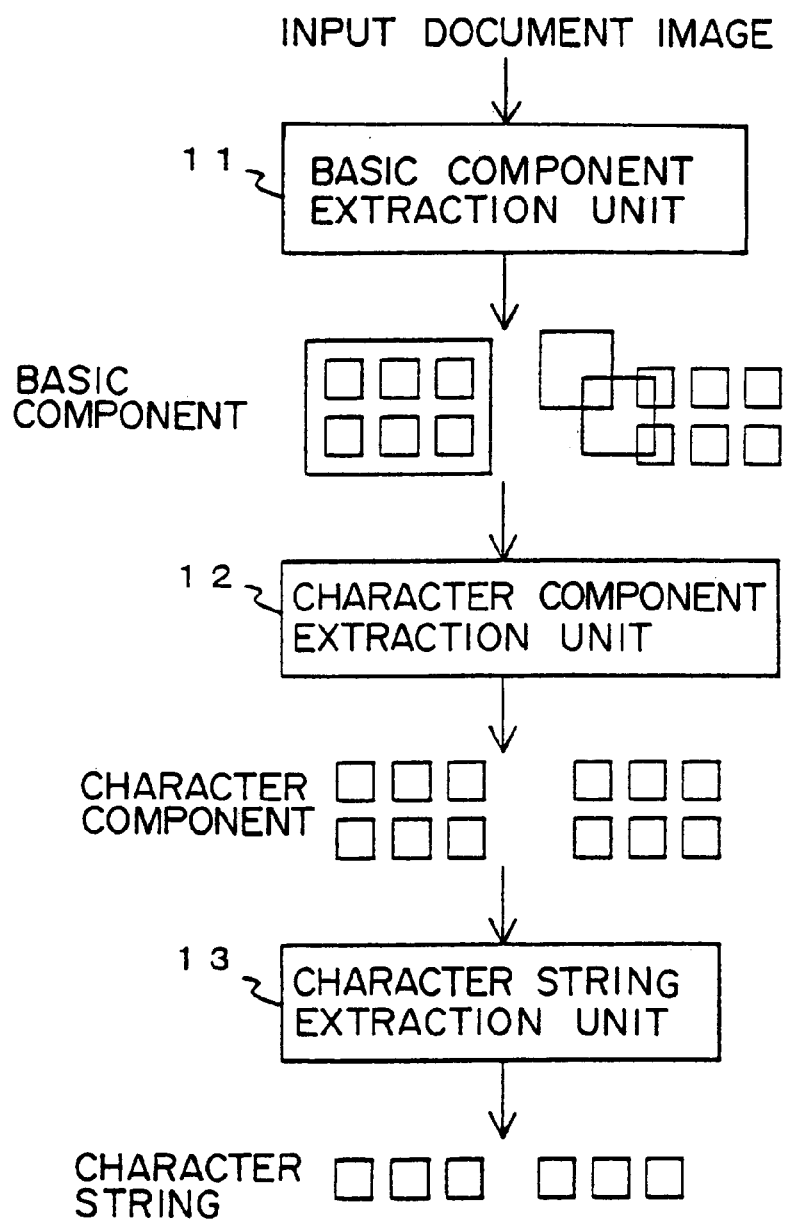
FIG. 2 shows the actual configuration of the character string extraction apparatus.

FIG. 2 shows the configuration of such a character string extraction apparatus. The character string extraction apparatus shown in FIG. 2 comprises a basic component extraction unit 11, a character component extraction unit 12 and a character string extraction unit 13.

The basic component extraction unit 11 extracts an aggregate of basic components from an input document image. The character component extraction unit 12 receives the aggregate of basic components as input, judges whether each basic component is a character component, using an inclusion relationship between the basic components, and extracts character components. The character string extraction unit 13 obtains a partial aggregate of character components corresponding to a character string, for example, based on the homogeneity of size or spatial closeness between the character components.

A basic component includes a character component, graphic component, etc. A character component is an image pattern representing a part of a character or the entire character, and a graphic component is an image pattern representing a part of a graphic, photograph, chart, etc., or the entire of it.

Figure 3:
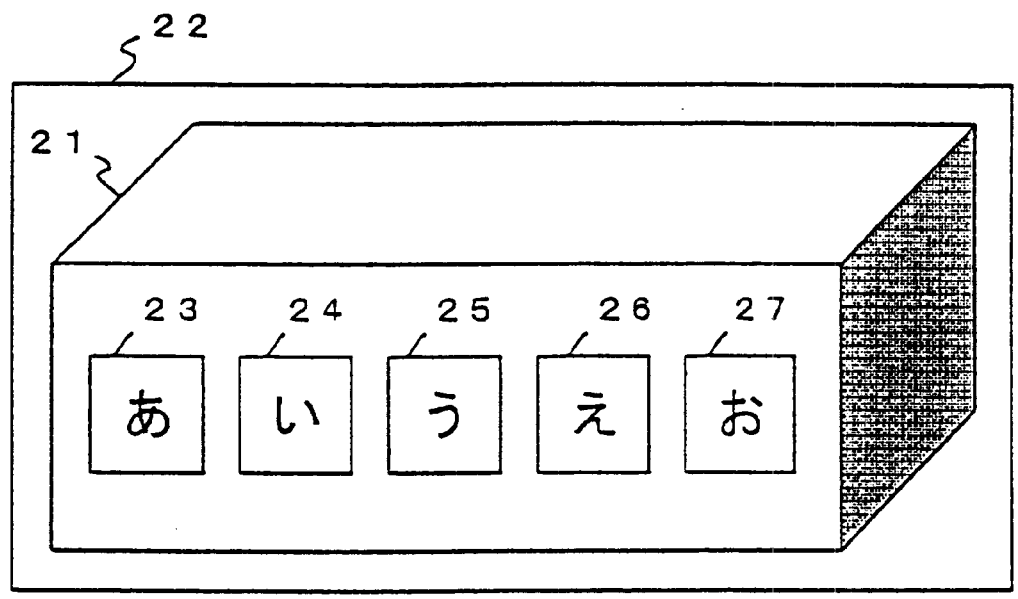
FIG. 3 shows character components and a graphic component.

For example, it is assumed that, as shown in FIG. 3, in a binary image, the circumscribed rectangle of a black pixel joint component is adopted as a basic component, and the circumscribed rectangle 22 of a graphic 21 and the circumscribed rectangles 23, 24, 25, 26 and 27 of characters "あ", "い", "う", "え" and "お" are extracted. In this case, the circumscribed rectangle 22 corresponds to a graphic component, and the circumscribed rectangles 23, 24, 25, 26 and 27 correspond to character components. However, the basic component extraction unit 11 extracts these components as basic components without distinction.

An inclusion relationship between basic components indicates a two-dimensional positional relationship, such as whether a specific basic component is included in another basic component or is excluded from it, whether a specific basic component overlaps other basic components, etc., in a document image.

Figure 4:
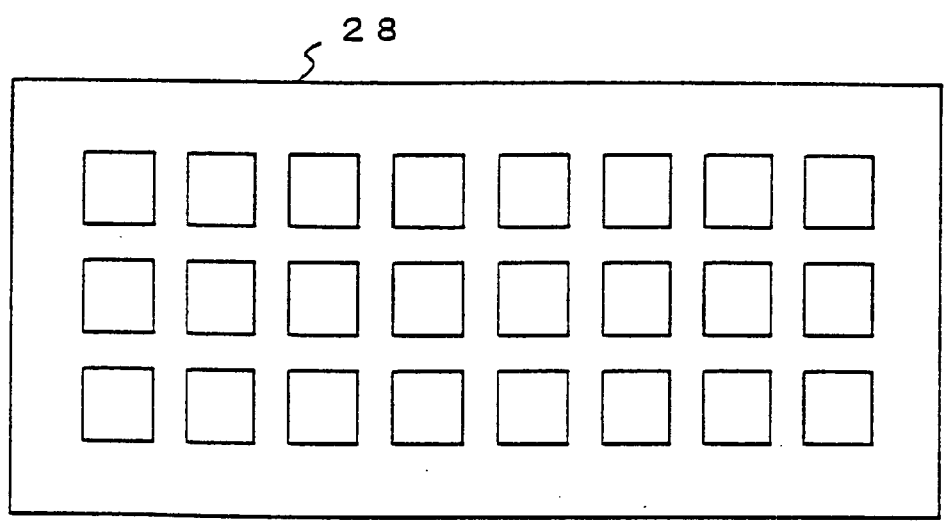
FIG. 4 shows a basic component including other basic components.

For example, if, as shown in FIG. 4, a basic component 28 includes many other basic components, there is a high possibility that the basic component 28 may correspond to a graphic component. Therefore, in such a case, the character component extraction unit 12 judges that the basic component is not a character component.

Figure 5:
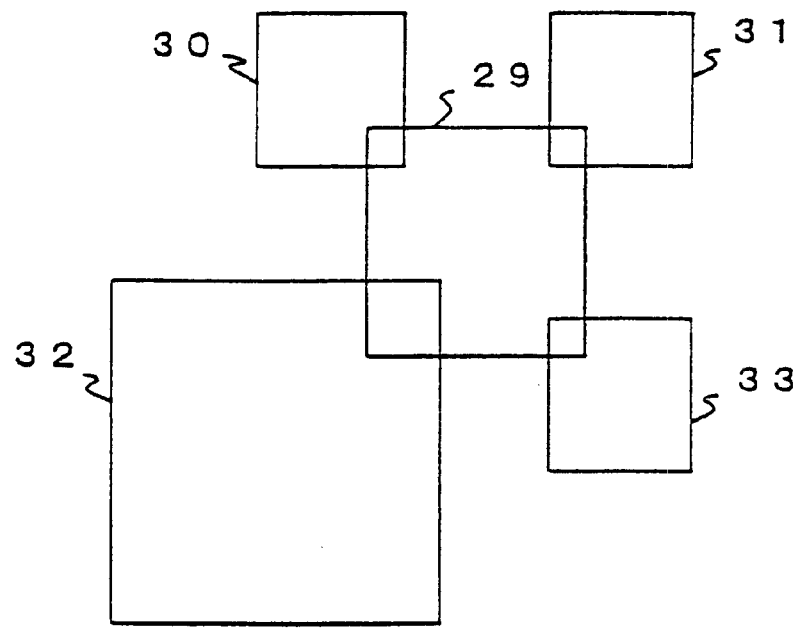
FIG. 5 shows a basic component overlapping other basic components.

If, as shown in FIG. 5, a basic component 29 overlaps many other basic components 30, 31, 32 and 33, there is a high possibility that the basic component 29 may correspond to a graphic component. Therefore, in such a case, the character component extraction unit 12 judges that the basic component 29 is not a character component.

If, as shown in FIG. 3, a basic component includes a character component, there is a high possibility that the basic component may correspond to a graphic component. Therefore, in such a case, the character component extraction unit 12 judges that a basic component including at least one basic component judged to be a character component by some method is not a character component.

Figure 6:
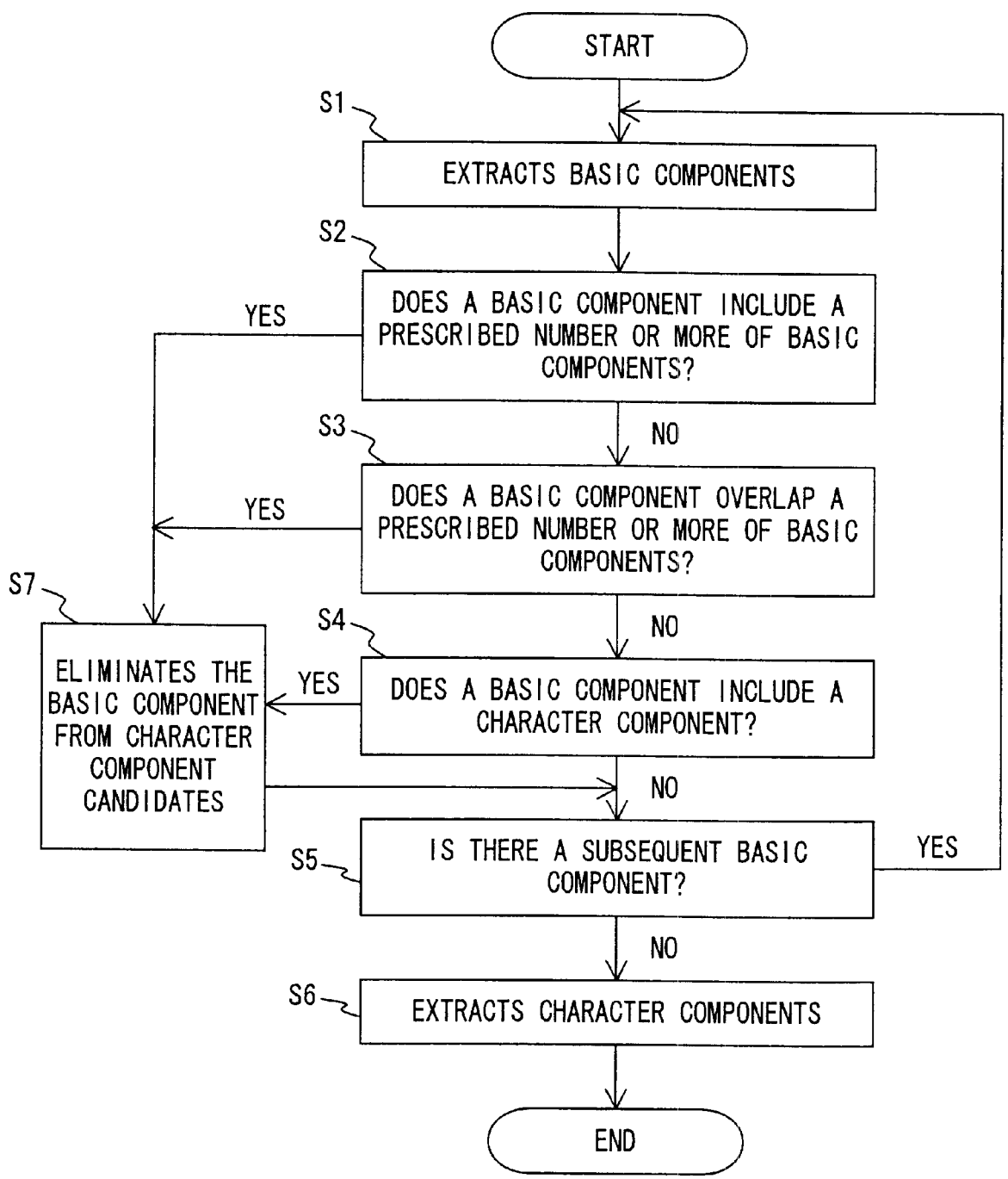
FIG. 6 is a flowchart showing a character component extraction process.

FIG. 6 is a flowchart showing such a character component extraction process. The character component extraction unit 12 first extracts one basic component from an aggregate of basic components (step S1) and checks whether the basic component includes a prescribed number or more of basic components (step S2). If the basic component includes the prescribed number or more of basic components, the character component extraction unit 12 eliminates the basic component from the character component candidates (step S7).

If the basic component does not include a prescribed number or more of basic components, then the character component extraction unit 12 checks whether the basic component overlaps a prescribed number or more of basic components (step S3). If the basic component overlaps the prescribed number or more of basic components, the character component extraction unit 12 eliminates the basic component from the character component candidates (step S7).

If the basic component does not overlap the prescribed number or more of basic components, then the character component extraction unit 12 checks whether the basic component includes one or more character components (step S4). If the basic component includes a character component, the character component extraction unit 12 eliminates the basic component from the character component candidates (step S7).

If the basic component is eliminated from the character component candidates or if in step S4 the basic component does not include a character component, the character component extraction unit 12 checks whether there is a subsequent basic component to be judged (step S5). If there is a subsequent basic component, the character component extraction unit 12 repeats the processes in and after step S12 for the basic component.

If there is no subsequent basic component, the character component extraction unit 12 extracts an aggregate of character components from the aggregate of the remaining basic components left as character component candidates by an arbitrary method (step S6) and terminates the process.

For the judgment in step S4, for example, each basic component can be character-recognized in advance. In this case, input basic components are classified into two groups: one group of basic components judged to be character components with high reliability and another group of the other basic components.

FIG. 7 shows the configuration for such a character component extraction process. The character component extraction unit 12 passes an input aggregate of basic components to a character recognition unit 41 and receives the recognition result. The recognition result includes both information indicating the type of the recognized character and the confidence degree of the recognition process.

The character component extraction unit 12 judges a basic component having a confidence degree of a prescribed threshold value or more as being a character component and performs the judgment in step S4 using the judgment result. At this time, a fairly high value is used as the threshold value of the confidence degree in order to improve the accuracy of the judgment in step S4.

Figure 8:
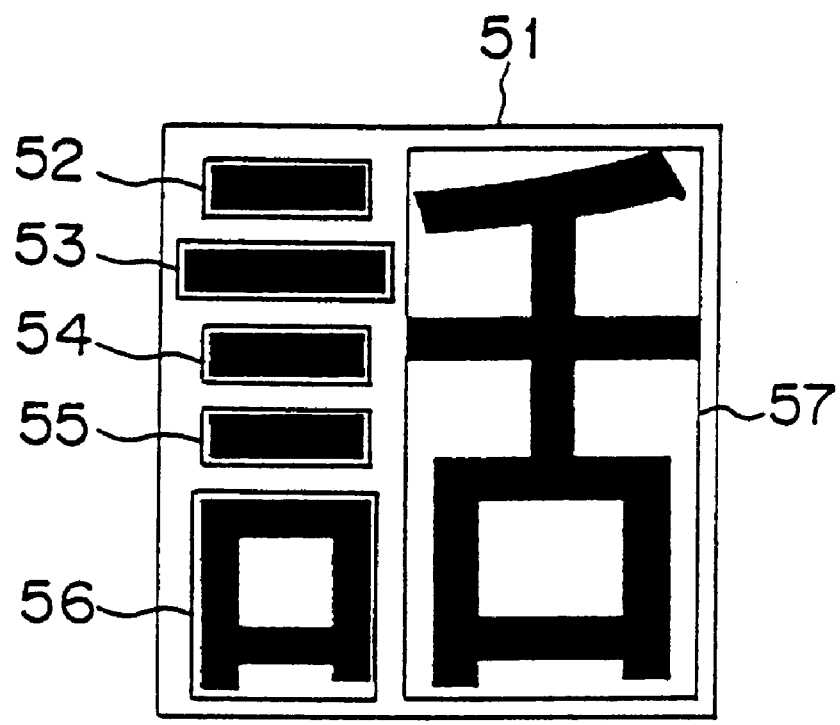
FIG. 8 shows a character component including character components.

There is also a case where a basic component including a character component corresponds to a character component. For example, in the case of the image of a character "話" shown in FIG. 8, the circumscribed rectangle 51 of "話" includes the circumscribed rectangles 52, 53, 54, 55, 56 and 57 of six parts which compose "話". Of these, the circumscribed rectangles 52 through 55 correspond to a character "一", the circumscribed rectangle 56 corresponds to a character "口" and the circumscribed rectangle 57 corresponds to a character "舌". In this case, the circumscribed rectangle 51 is judged not to be a character component in step S4.

If a basic component includes a character component corresponding to a simple character, such as "一", "口", etc., it is preferable to add an exceptional process, such as a process where the basic component is not eliminated from the character component candidates. Whether a basic component corresponds to a simple character can be judged by character recognition, etc. Alternatively, a ratio of the size of a basic component to the size of a character component included in the basic component can be obtained. If the ratio is equal to or more than a prescribed value, the basic component can be judged not to be a character component.

As a method for judging in advance whether the basic component is a character component, a method disclosed in Patent Application Laid-open No. 61-026149 (Document Image File Registration/Retrieval Apparatus) of Japanese Laid-open Patent Gazette can also be used. According to this method, a character stroke area can be identified using both the number of black pixels and the joint number of a black run (the number of black pixels consecutively arranged in a line).

In character component extraction of step S6, whether a basic component is a character component is judged based on the size/shape of the basic component or the confidence degree of the character recognition result, and basic components which are judged to be character components are outputted for the subsequent character string extraction process.

Although in the conventional character component extraction process, only the process in step S6 is performed, in this preferred embodiment, an inclusion relationship between basic components is also used as a criterion. Therefore, even basic components that could not be conventionally judged correctly can now be judged correctly, and as a result, not only the accuracy of character component extraction but also the accuracy of character string extraction can be improved.

After character components are extracted in this way, the character string extraction unit 13 extracts a character string from an aggregate of character components using, for example, a method disclosed in Japanese Patent Application No. 10-146926 (Document Image Recognition Apparatus and Document Image Recognition Program Storage Medium). According to this method, the reliability of a character string is evaluated based both on homogeneity, indicating that character components are similar in size/interval between character components, and spatial closeness, indicating that the distance between character components is short compared with the size. The reliability of a character string can also be evaluated based on the homogeneity of another characteristic, such as color, etc., of a character component.

As described above, it is judged that character components of which the size, distance between character components, color, etc., are similar or character components which are located close to each other correspond to characters which belong to the same character string and an aggregate of these character components is outputted as one character string.

The accuracy of character string extraction can be further improved by making the character component extraction unit 12 and character string extraction unit 13 interact with one another. In this case, the character string extraction apparatus performs character string extraction again by judging that only character components included in character strings having the high confidence degree of character string recognition are true character components and that character components included in the other character strings are not character components.

Figure 9:
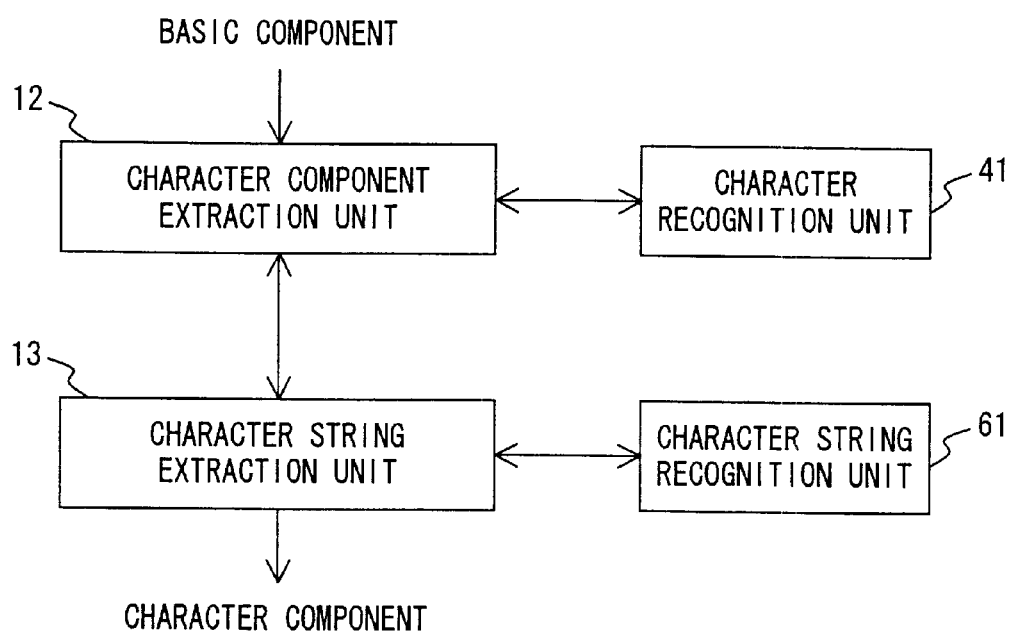
FIG. 9 shows character string extraction based on character string recognition.

FIG. 9 shows the configuration for such a character string extraction process. The character component extraction unit 12 passes an input aggregate of basic components to a character recognition unit 41 and receives the recognition result as described above. Then, the character component extraction unit 12 judges basic components having a prescribed threshold value or more of confidence degree as being character components and performs the judgment in step S4 using the judgment result.

Figure 10:
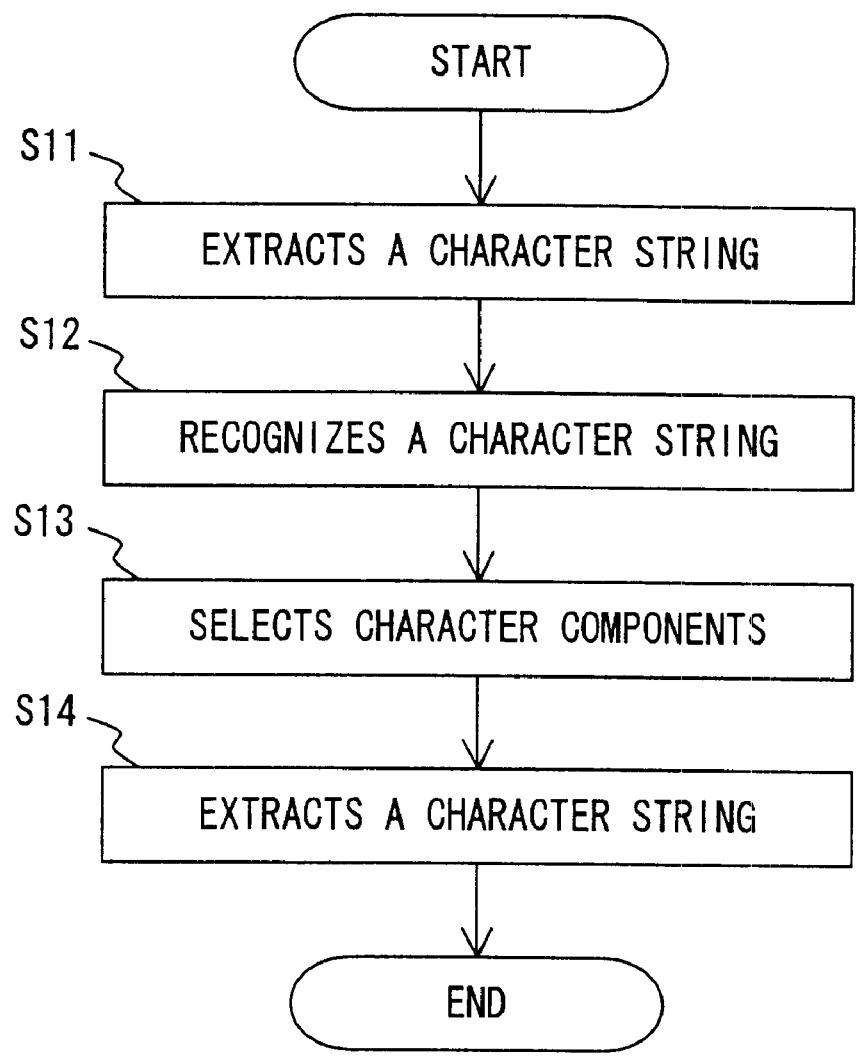
FIG. 10 is a flowchart showing a character string extraction process.

The character string extraction unit 13 performs a character string extraction process as shown in FIG. 10. The character string extraction unit 13 first receives an aggregate of character components from the character component extraction unit 12 and extracts a character string based on the homogeneity of size and spatial closeness of the character components (step S11). Then, the character string extraction unit 13 passes the character string aggregate obtained as a result of the character string extraction to a character string recognition unit 61 and receives the recognition result (step S12).

At this time, the character string recognition unit 61 performs character recognition, character string recognition, etc., and returns both information indicating the recognized character string and the confidence degree of the recognition process to the character string extraction unit 13 as the recognition result.

Then, the character string extraction unit 13 extracts character strings having a prescribed value or more of a confidence degree, selects character components included in the character strings and passes the character components to the character component extraction unit 12 (step S13).

The character component extraction unit 12, for example, judges the character components received from the character string extraction unit 13 as being true character components, and judges character components other than those received from the character string extraction unit 13 as being not character components. Then, the character component extraction unit 12 generates a new aggregate of character components and outputs the new aggregate to the character string extraction unit 13 again. On receipt of this aggregate, the character string extraction unit 13 extracts a character string from the new aggregate of character components (step S14) and terminates the process.

As described above, both the accuracy of character component extraction and the accuracy of character string extraction can be improved by making the character component extraction unit 12 and the character string extraction unit 13 interact with one another and repeating the character extraction. For example, a candidate which is ranked low in the first character string extraction can be judged to be a character string in the second character extraction. Although in this example, character extraction is repeated twice, it can also be repeated three times or more.

Next, the configuration of the basic component extraction unit 11 shown in FIG. 2 is described with reference to FIGS. 11 through 16.

Figure 11:
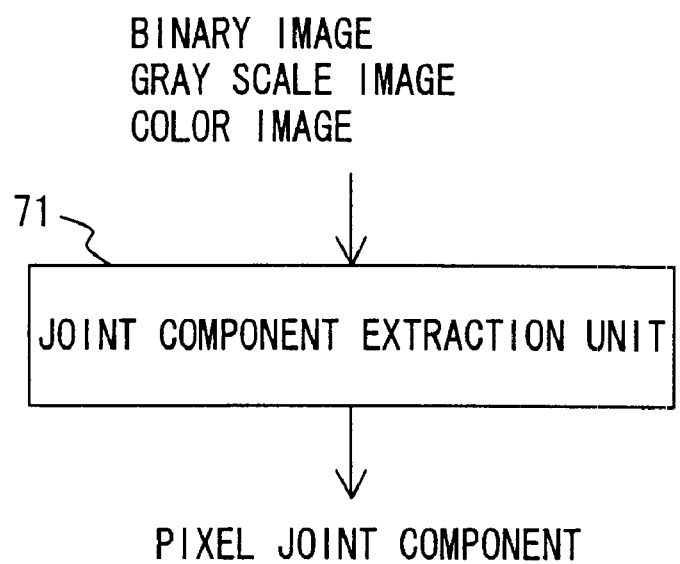
FIG. 11 shows the configuration of the first basic component extraction unit.

A basic component extraction unit 11 shown in FIG. 11 comprises a joint component extraction unit 71. If a binary image is input as a document image, the joint component extraction unit 71 extracts black pixel joint components from the input image and outputs the components as basic components. If a gray scale image, such as a gray scale document, is input, the joint component extraction unit 71 extracts the joint components of pixels, the gray levels of which are almost the same, from the input image and outputs the components as basic components. If a color image, such as a color document, is input, the joint component extraction unit 71 extracts pixel joint components, the colors of which are almost the same, from the input image and outputs the components as basic components.

In the case of a gray scale image, for example, there is no problem if gray levels of pixels is classified in advance into a plurality of ranges, and adjacent pixels which belong to the same range are jointed and a pixel joint component is generated. In the case of a color image, there is no problem if color information (RGB values) of pixels is classified in advance into a plurality of ranges, and adjacent pixels that belong to the same range are jointed and a pixel joint component is generated.

Using such a basic component extraction unit, basic components can be extracted from not only a binary image but also from a gray scale image or color image, and as a result, a character string can be extracted from these documents.

A basic component extraction unit shown in FIG. 12 comprises a joint component extraction unit 71 and a circumscribed rectangle generation unit 72. The process of the joint component extraction unit 71 is the same as that shown in FIG. 11. The circumscribed rectangle generation unit 72 generates a rectangle that circumscribes an input pixel joint component, and outputs the rectangle as a basic component.

Since the shape of a circumscribed rectangle is simpler than the shape of a pixel joint component, the judgment using the inclusion relationship between basic components becomes simpler and as a result, the speed of subsequent processes, such as character component extraction, character string extraction, etc., can be improved. An arbitrary circumscribed figure, such as another polygon, a circle, an ellipse, etc., can also be used instead of the circumscribed rectangle.

A basic component extraction unit shown in FIG. 13 comprises a joint component extraction unit 71, a circumscribed rectangle generation unit 72 and a binary image generation unit 73. The respective processes of the joint component extraction unit 71 and circumscribed rectangle generation unit 72 are the same as the respective processes shown in FIG. 12. The binary image generation unit 73 generates a binary image by binarizing a gray scale image or color image included in a circumscribed rectangle and outputs the image to the joint component extraction unit 71.

The binary image generation unit 73 generates a binary image from a gray scale image or color image, using, for example, a method disclosed in Patent Application Laid-open No. 10-353045 (Color Document Image Recognition Apparatus) of Japanese Laid-open Patent Gazette. According to this method, the lightness component of each pixel is binarized using a prescribed threshold value and a binary image composed of pixels having either a value corresponding to a paint area or a value corresponding to a background area is generated.

The joint component extraction unit 71 extracts pixel joint components having the same value from an input binary image and outputs the components as basic components. Alternatively, the circumscribed rectangle generation unit 72 can also generate the circumscribed rectangles of the obtained pixel joint components and can output the rectangles as basic components.

If such a basic component extraction unit is used, basic components are extracted after parts corresponding to the basic components in a gray scale image or color image are binarized. Therefore, in this case, basic components can be extracted more accurately.

Figure 14:
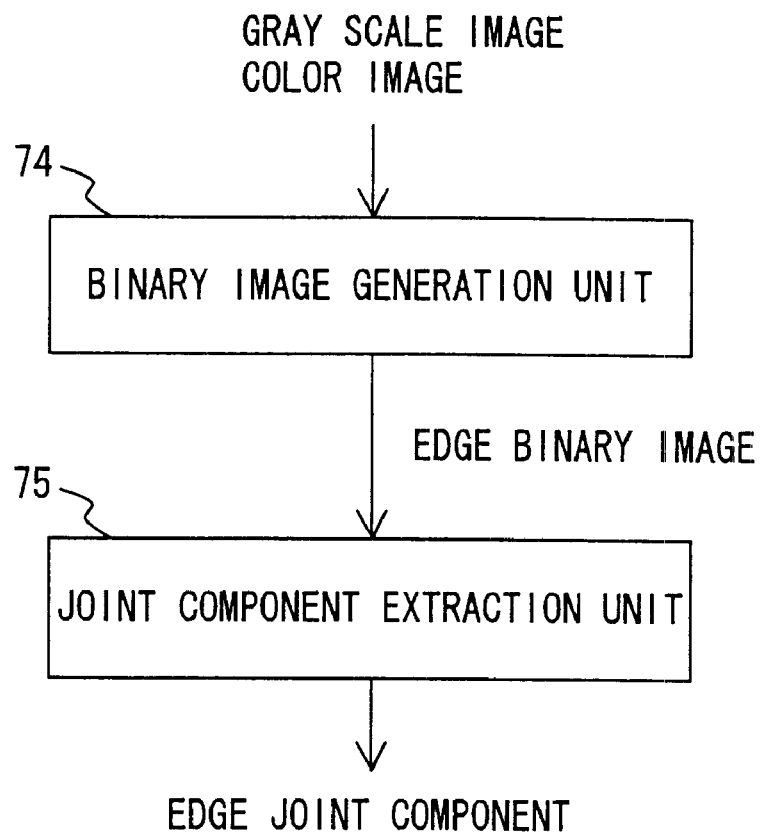
FIG. 14 shows the configuration of the fourth basic component extraction unit.

A basic component extraction unit shown in FIG. 14 comprises a binary image generation unit 74 and a joint component extraction unit 75. The binary image generation unit 74 generates an edge binary image from an input gray scale image or color image. The joint component extraction unit 75 extracts pixel joint components (edge joint components) having the same value from the edge binary image and outputs the components as basic components.

The binary image generation unit 74 generates an edge binary image from a gray scale image or color image using, for example, the method disclosed in Patent Application Laid-open No. 10-353045 described above. According to this method, an edge strength image or edge direction image is generated by an edge extraction process, the generated image is binarized by a prescribed threshold value and an edge binary image is generated. For an edge extraction process, a Sobel filter, a Laplacian filter, etc., are used.

If such a basic component extraction unit is used, the outline of the paint area in a gray scale image or color image can be extracted by edge extraction. Therefore, in this case, basic components can be extracted more accurately.

Figure 15:
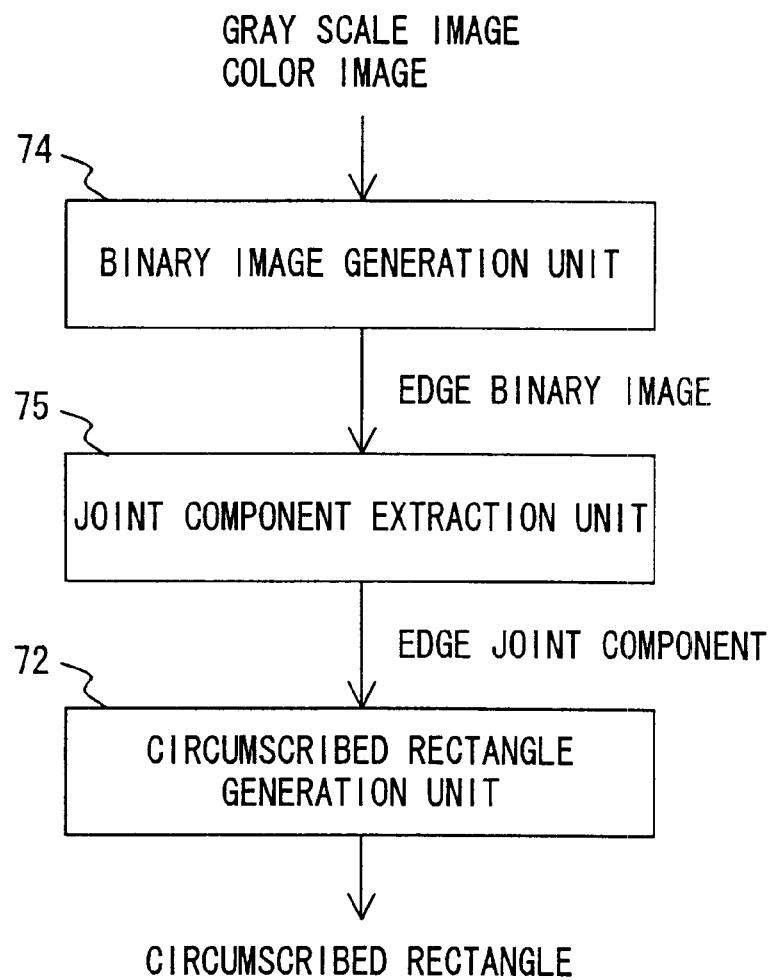
FIG. 15 shows the configuration of the fifth basic component extraction unit.

A basic component extraction unit shown in FIG. 15 comprises a binary image generation unit 74, a joint component extraction unit 75 and a circumscribed rectangle generation unit 72. The respective processes of the binary image generation unit 74 and joint component extraction unit 75 are the same as the respective processes shown in FIG. 14. The circumscribed rectangle generation unit 72 generates rectangles, each of which circumscribes an input edge joint component, and outputs the rectangles as basic components.

Figure 16:
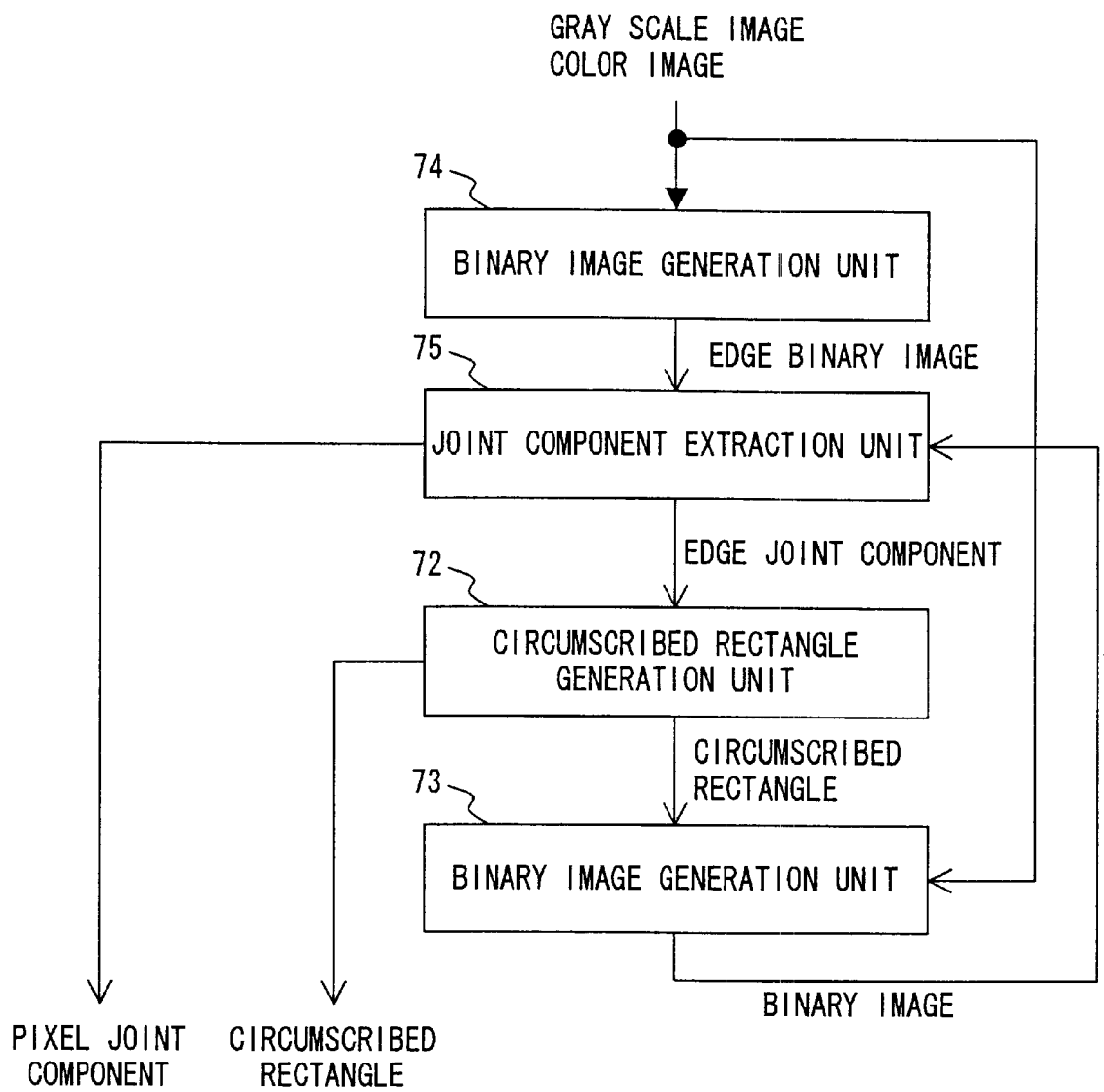
FIG. 16 shows the configuration of the sixth basic component extraction unit.

A basic component extraction unit shown in FIG. 16 comprises a binary image generation unit 74, a joint component extraction unit 75, a circumscribed rectangle generation unit 72 and a binary image generation unit 73. The respective processes of the binary image generation unit 74, joint component extraction unit 75 and circumscribed rectangle generation unit 72 are the same as the respective processes shown in FIG. 15. The binary image generation unit 73 generates a binary image by binarizing a gray scale image or color image included in an input circumscribed rectangle and outputs the image to the joint component extraction unit 75.

The joint component extraction unit 71 extracts pixel joint components having the same value from an input binary image and outputs the components as basic components. Alternatively, the circumscribed rectangle generation unit 72 can generate the circumscribed rectangles of obtained pixel joint components and can output the rectangles as basic components.

As described above, even if a gray scale image or color image is input as a document image, by using one of the basic component extraction units shown in FIGS. 11 through 16, basic components can be extracted, and both character components and a character string can be extracted based on the basic components.

In particular, if the basic component extraction unit shown in FIG. 16 and the configuration shown in FIG. 7 are combined, character recognition can be performed for accurate basic components obtained by binarization and the inclusion relationship between the basic components can be checked based on the recognition result. Therefore, in this case, more accurate character component extraction and character string extraction become possible. If the basic component extraction unit shown in FIG. 16 and the configuration shown in FIG. 9 are combined, far more accurate character component extraction and character string extraction become possible because of the interaction between a character component extraction unit and a character string extraction unit.

Figure 17:
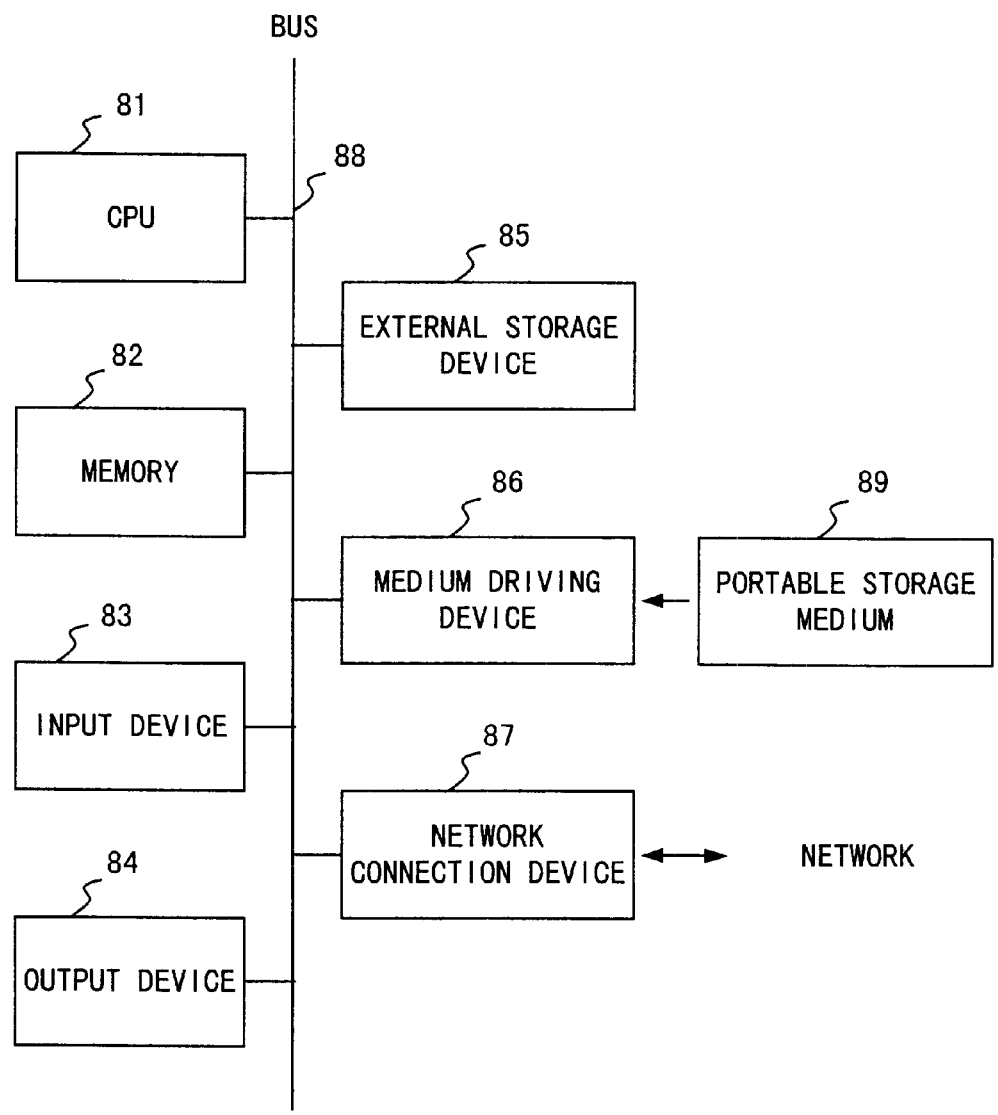
FIG. 17 shows the configuration of an information processing device.

The character string extraction apparatus described above can be configured using an information processing device (computer), as shown in FIG. 17. The information processing device shown in FIG. 17 comprises a CPU (central processing unit) 81, a memory 82, an input device 83, an output device 84, an external storage device 85, a medium driving device 86 and a network connection device 87, which are connected to one another by a bus 88.

The memory 82 is, for example, a ROM (read only memory), RAM (random access memory), etc., and stores a program and data which are used for the process. The CPU 81 performs necessary processes by using the memory 82 and running the program.

In this case, the basic component extraction unit 11, character component extraction unit 12 and character string extraction unit 13 shown in FIG. 2, the character recognition unit 41 shown in FIG. 7 and the character string recognition unit 61 shown in FIG. 9 are installed as software components corresponding to the program stored in the memory 82.

The input device 83 is, for example, a keyboard, pointing device, touch panel, etc., and is used to input user instructions and information. The output device 84 is, for example, a display, printer, speaker, etc., and is used to output both inquiries to a user and process results.

The external storage device 85 is, for example, a magnetic disk device, optical disk device, magneto-optical disk device, etc. The information processing device can store the program and data described above in the external storage device 85 and can use the program and data by loading them into the memory 82, if required.

The medium driving device 86 drives a portable storage medium 89 and accesses the recorded content. As the portable storage medium 89, an arbitrary computer-readable storage medium, such as a memory card, floppy disk, CD-ROM (compact disk read only memory), optical disk, magneto-optical disk, etc., is used. A user can store the program and data described above in this portable storage medium and can use the program and data by loading them into the memory 82, if required.

The network connection device 87 communicates with an external device via an arbitrary network (line) and transmits/receives data accompanying communications. The information processing device can receive the program and data described above from an external device via the network connection device 87 and can use the program and data by loading them into the memory 82, if required.

Figure 18:
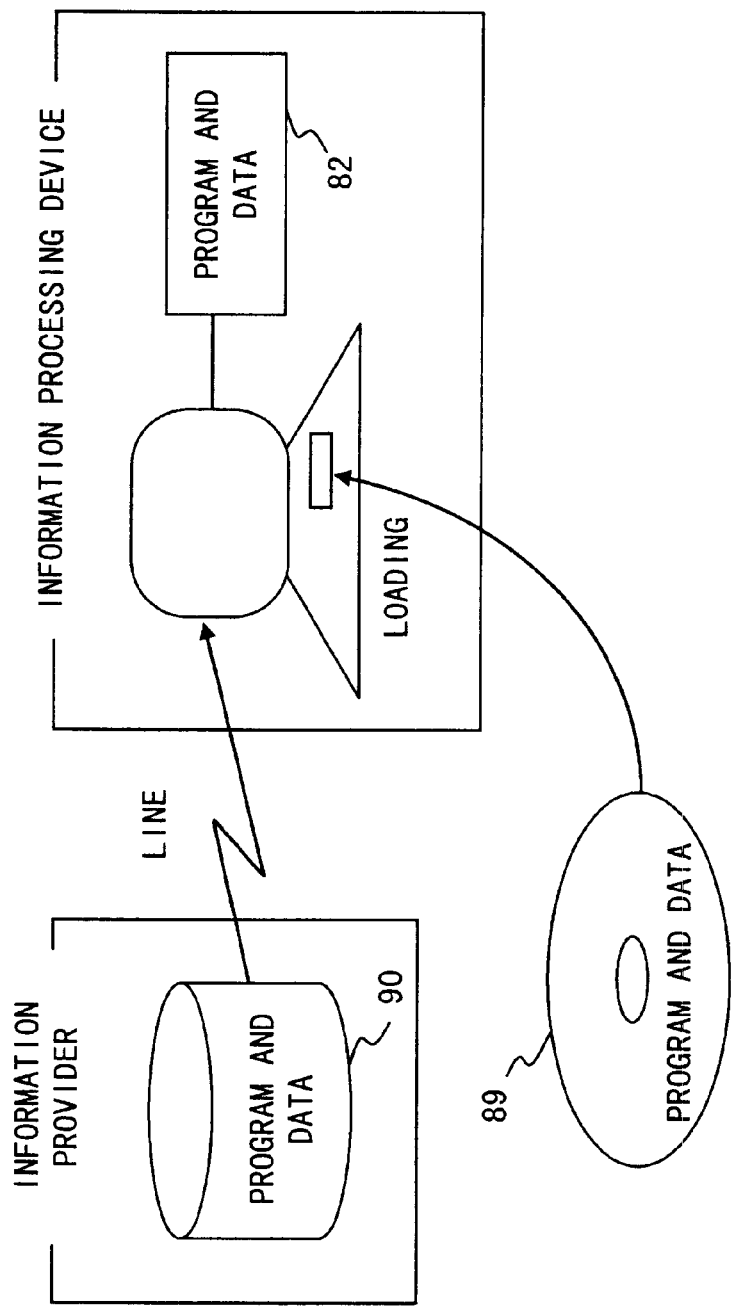
FIG. 18 shows examples of storage media.

FIG. 18 shows examples of computer-readable storage media for supplying the information processing device shown in FIG. 17 with a program and data. The program and data stored in the portable storage medium 89 or an external database 90 can be loaded into the memory 82. Then, the CPU 81 executes the program using the data and performs necessary processes.

According to the present invention, basic components which conventionally could not be judged correctly as to whether the basic component of a document image is a character component, can also be judged correctly, and as a result, not only the accuracy of character component extraction but also the accuracy of character string extraction can be improved.

What is claimed is:

1. A character string extraction apparatus, comprising:
    a basic component extraction unit extracting an aggregate of a plurality of basic components from an input document image;
    a character component extraction unit judging whether a basic component corresponds to a character component using an inclusion relationship between basic components included in the aggregate of the basic components, the inclusional relationship corresponding to a positional relationship indicating whether a basic component includes another basic component in the input document image, eliminating the basic component that has the inclusional relationship and extracting an aggregate of character components; and
    a character string extraction unit extracting a character string using the aggregate of the character components.

2. The character string extraction apparatus according to claim 1, wherein said character component extraction unit judges a basic component including a prescribed number or more of basic components as being not the character component.

3. The character string extraction apparatus according to claim 1, wherein said character component extraction unit judges a basic component overlapping the prescribed number or more of basic components as being not the character component.

4. The character string extraction apparatus according to claim 1, wherein said character component extraction unit judges a basic component including a basic component which is judged to be the character component as being not a character component.

5. The character string extraction apparatus according to claim 4, further comprising a character recognition unit performing character recognition of the basic components extracted by said basic component extraction unit, wherein said character component extraction unit judges the basic component including the basic component which is judged to be the character component based on character recognition as being not the character component.

6. The character string extraction apparatus according to claim 1, wherein said character component extraction unit and character string extraction unit interact with one another and character string extraction is repeated a plurality of times.

7. The character string extraction apparatus according to claim 1, wherein if a gray scale image is input as the document image, said basic component extraction unit obtains a joint component of pixels having gray levels of a prescribed range in the gray scale image and extracts at least one of the joint component and a circumscribed figure of the joint component as a basic component.

8. The character string extraction apparatus according to claim 1, wherein if a color image is input as the document image, said basic component extraction unit obtains a joint component of pixels having color information of a prescribed range in the color image and extracts at least one of the joint component and a circumscribed figure of the joint component as a basic component.

9. A character string extraction apparatus comprising:

a basic component extraction unit extracting an aggregate of a plurality of basic components from an input document image;

a character component extraction unit judging whether a basic component corresponds to a character component using an inclusion relationship between basic components included in the aggregate of the basic components, the inclusional relationship corresponding to a positional relationship indicating whether a basic component includes another basic component in the input document image, and extracting an aggregate of character components;

a character string extraction unit extracting a character string using the aggregate of the character components; and a character string recognition unit recognizing the character string extracted by said character string extraction unit, wherein said character component extraction unit judges character components included in a character string having a high confidence degree obtained by recognition as being true character components, judges character components included in another character string as being not character components and extracts a new aggregate of character components, and said character string extraction unit extracts a character string again by using the new aggregate of the character components.

10. A character string extraction apparatus comprising:

a basic component extraction unit extracting an aggregate of a plurality of basic components from an input document image;

a character component extraction unit judging whether a basic component corresponds to a character component using an inclusion relationship between basic components included in the aggregate of the basic components, the inclusional relationship corresponding to a positional relationship indicating whether a basic component includes another basic component in the input document image, and extracting an aggregate of character components; and a character string extraction unit extracting a character string using the aggregate of the character components, and wherein if a gray scale image is input as the document image, said basic component extraction unit obtains a joint component of pixels having gray levels of a prescribed range in the gray scale image, generates a binary image by binarizing an image included in a circumscribed figure of the joint component and extracts at least one of a pixel joint component in the obtained binary image and a circumscribed figure of the pixel joint component as a basic component.

11. A character string extraction apparatus comprising:

a basic component extraction unit extracting an aggregate of a plurality of basic components from an input document image;

a character component extraction unit judging whether a basic component corresponds to a character component using an inclusion relationship between basic components included in the aggregate of the basic components, the inclusional relationship corresponding to a positional relationship indicating whether a basic component includes another basic component in the input document image, and extracting an aggregate of character components; and a character string extraction unit extracting a character string using the aggregate of the character components, and wherein if a color image is input as the document image, said basic component extraction unit obtains a joint component of pixels having color information of a prescribed range in the color image, generates a binary image by binarizing an image included in a circumscribed figure of the joint component and extracts at least one of a pixel joint component in the obtained binary image and a circumscribed figure of the pixel joint component as a basic component.

12. A character string extraction apparatus comprising:

a basic component extraction unit extracting an aggregate of a plurality of basic components from an input document image;

a character component extraction unit judging whether a basic component corresponds to a character component using an inclusion relationship between basic components included in the aggregate of the basic components, the inclusional relationship corresponding to a positional relationship indicating whether a basic component includes another basic component in the input document image, and extracting an aggregate of character components; and a character string extraction unit extracting a character string using the aggregate of the character components, and wherein if one of a gray scale image and a color image is input as the document image, said basic component extraction unit generates an edge binary image of the document image, obtains an edge joint component in the obtained edge binary image and extracts at least one of the edge joint component and a circumscribed figure of the edge joint component as a basic component.

13. A character string extraction apparatus comprising:

a basic component extraction unit extracting an aggregate of a plurality of basic components from an input document image;

a character component extraction unit judging whether a basic component corresponds to a character component using an inclusion relationship between basic components included in the aggregate of the basic components, the inclusional relationship corresponding to a positional relationship indicating whether a basic component includes another basic component in the input document image, and extracting an aggregate of character components; and a character string extraction unit extracting a character string using the aggregate of the character components, and wherein if one of a gray scale image and a color image is input as the document image, said basic component extraction unit generates an edge binary image of the document image, obtains an edge joint component in the obtained edge binary image, generates a binary image by binarizing an image included in a circumscribed figure of the edge joint component and extracts at least one of a pixel joint component in the obtained binary image and a circumscribed figure of the pixel joint component as a basic component.

14. A character string extraction apparatus, comprising:

a basic component extraction unit extracting an aggregate of a plurality of basic components from an input document image;

a character component extraction unit judging whether a basic component corresponds to a character component using an inclusion relationship between basic components included in the aggregate of the basic components, the inclusional relationship corresponding to a positional relationship indicating whether a basic component includes another basic component in the input document image, eliminating the basic component that has the inclusional relationship and extracting an aggregate of character components; and a character string extraction unit obtaining a partial aggregate of character components based on at least one of homogeneity of size and spatial closeness between character components included in the aggregate of the character components and extracting the partial aggregate of the character components as a character string.

15. A computer-readable storage medium on which is recorded a program enabling a computer to extract a character string based on an aggregate of a plurality of character components included in an input document image, said process comprising:

judging whether a basic component corresponds to a character component using an inclusion relationship between basic components included in the document image, the inclusional relationship corresponding to a positional relationship indicating whether a basic component includes another basic component in the input document image, and eliminating the basic component that has the inclusional relationship; and extracting the aggregate of the character components based on a judgment result.

16. A character string extraction method, comprising:

extracting an aggregate of a plurality of basic components from an input document image;

judging whether a basic component corresponds to a character component using an inclusion relationship between basic components included in the aggregate of the basic components, the inclusional relationship corresponding to a positional relationship indicating whether a basic component includes another basic component in the input document image, and eliminating the basic component that has the inclusional relationship;

extracting an aggregate of character components based on a judgment result; and extracting a character string using the aggregate of the character components.

17. A character string extraction apparatus, comprising:

basic component extraction means for extracting an aggregate of a plurality of basic components from an input document image;

character component extraction means for judging whether a basic component corresponds to a character component using an inclusion relationship between basic components included in the aggregate of the basic components and extracting an aggregate of character components, the inclusional relationship corresponding to a positional relationship indicating whether a basic component includes another basic component in the input document image, and eliminating the basic component that has the inclusional relationship; and character string extraction means for extracting a character string using the aggregate of the character components.

18. A method, comprising:

extracting basic image components from an input document image;

determining whether a first basic image component corresponds to a character component using a component inclusion relationship between the first basic image component and the basic image components and eliminating the first basic component that has the inclusion relationship; and extracting the character component from the basic image components from which the first basic image component has been eliminated.

* * * * *

UNITED STATES PATENT AND TRADEMARK OFFICE
CERTIFICATE OF CORRECTION

PATENT NO. : 6,701,015 B2
DATED : March 2, 2004
INVENTOR(S) : Katsuhito Fujimoto et al.

It is certified that error appears in the above-identified patent and that said Letters Patent is hereby corrected as shown below:

Title page,
Item [56], References Cited, FOREIGN PATENT DOCUMENTS, Please add:
-- 5,790,701    8/1998    Shijo, et al.
  JP A-08-297718   11/1996
  JP A-09-16713    1/1997
  JP A-05-166002   7/1993
  JP A-07-168911   7/1995
  JP A-08-55188    2/1996
  JP A-09-81743    3/1997
  JP A-05-28305    2/1993
  JP A-61-26149    2/1986
  JP A-61-26150    2/1986
  JP A-61-72374    4/1986
  JP A-62-165284   7/1987
  JP A-09-167233   6/1997
  JP A-06-111060   4/1994 --

Column 13,
Line 35, insert -- , -- before "comprising"
Line 60, insert -- , -- before "comprising"

Column 14,
Line 19, insert --, -- before "comprising"
Line 43, insert --, -- before "comprising"

Signed and Sealed this

Eighth Day of June, 2004

JON W. DUDAS
*Acting Director of the United States Patent and Trademark Office*